US005933074A

United States Patent [19]

Settles et al.

[11] Patent Number: 5,933,074

[45] Date of Patent: Aug. 3, 1999

[54] REMOTE CONTROL TRANSMITTER BROADCASTING RF SIGNALS CONVEYING PLURAL INFORMATION COMPONENTS

[75] Inventors: Steven Settles, Sterling Heights; Steven Kulha, Shelby Township, both of Mich.

[73] Assignee: UT Automotive Dearborn, Inc., Dearborn, Mich.

[21] Appl. No.: 09/103,017

[22] Filed: Jun. 23, 1998

[51] Int. Cl.[6] ...................................................... B60R 25/10

[52] U.S. Cl. .................... 340/426; 340/539; 340/825.69; 340/825.72; 340/825.73; 340/825.74; 340/825.76; 455/101; 455/151.1; 455/151.2; 455/151.4; 455/152.1

[58] Field of Search ..................................... 340/426, 539, 340/825.31, 825.69, 825.72, 825.49, 825.73, 825.74, 825.76; 455/101, 102, 103, 104, 150.1, 151.1, 151.2, 152.1, 151.4

[56] References Cited

U.S. PATENT DOCUMENTS

| | | | |
|---|---|---|---|
| 5,319,364 | 6/1994 | Waraksa et al. | 340/825.72 |
| 5,345,601 | 9/1994 | Takagi et al. | 455/59 |
| 5,517,189 | 5/1996 | Bachhunber et al. | 340/825.69 |
| 5,600,323 | 2/1997 | Boschini | 340/825.69 |
| 5,602,535 | 2/1997 | Boyles | 340/825.31 |
| 5,729,191 | 3/1998 | Allen et al. | 340/426 |
| 5,781,106 | 7/1998 | Liger | 340/505 |

*Primary Examiner*—Jeffery A. Hofsass
*Assistant Examiner*—Julie B. Lieu
*Attorney, Agent, or Firm*—Howard & Howard

[57] ABSTRACT

A unique transmitter broadcasting a single RF (radio frequency) signal in response to a single input for controlling a plurality of electrical vehicle accessories. To control the plurality of accessories, the RF signal conveys multiple information components. In a preferred embodiment, the transmitter operates in conjunction with a RF receiver installed in a vehicle to unlock the doors of the vehicle when a unique RF signal is broadcast within a defined range and actuate the horn of the vehicle when the same RF signal is broadcast outside of the defined range.

12 Claims, 2 Drawing Sheets

REMOTE CONTROL TRANSMITTER BROADCASTING RF SIGNALS CONVEYING PLURAL INFORMATION COMPONENTS

BACKGROUND OF THE INVENTION

This invention relates to a remote control transmitter for transmitting a single RF (radio frequency) signal that contains plural information components.

Many modern vehicles include a RF receiver and small, hand-held transmitters allowing an operator to remotely control different electrical vehicle accessories. Typically, the RF receiver is electrically connected to several vehicle accessories, such as power door locks, power trunk release, interior lights, and/or the horn. The RF receiver includes an antenna which receives or captures local airborne RF signals. Upon receipt of a matching RF signal from an appropriate transmitter, the RF receiver electrically actuates the appropriate vehicle accessory.

The transmitters are sometimes referred to as key fobs. To remotely control different vehicle accessories, the transmitters are pre-programmed to transmit or broadcast several unique RF signals. To actuate a specific vehicle accessory, the transmitters include a set of input switches. The manual depression of each input switch transmits a unique RF signal which actuates a specific vehicle accessory via the RF receiver.

Each transmitter is typically attached to a key ring intended to be placed in a pants pocket or stored in a purse. As a result, the size of the transmitter housing is limited. Accordingly, prior art transmitters have included only a few input switches, usually three or four. The few input switches have restricted the number of vehicle accessories which may be remotely controlled with the transmitters. To increase the functionality of a transmitter, it would be desirable to provide a transmitter capable of remotely controlling at least two vehicle accessories with one input switch.

SUMMARY OF THE INVENTION

In a disclosed embodiment of this invention, a remote control transmitter includes a power source and one input switch for producing an input signal transmitted by a transmitter circuit. The transmitter circuit responds to the input signal by transmitting a single radio frequency signal that carries plural pieces of information. As one example, a first radio frequency signal component may be relatively strong and thus a transmitted radio signal is produced to determine the first distance. A second radio frequency component may be relatively weak and thus transmitted a second predetermined distance, with the first predetermined distance being greater than the second predetermined distance.

The receiver actuates a first accessory in response to a radio frequency signal which contains only the first signal component and actuates a second accessory in response to a radio frequency signal which contains both the first and second signal components.

In a preferred embodiment, the transmitter circuit responds to the depression of the input switch by transmitting the first signal component (detectable at) a distance greater than four meters and by transmitting the second signal component a distance less than four meters to actuate the vehicle horn in response to the first signal component and to unlock the vehicle doors in response to the combination of the first and second signal components. Honking or beeping the vehicle horn when the signal transmission is more than a set distance from the vehicle aids the operator in locating the vehicle in a crowded parking lot. Unlocking the vehicle doors only when the signal transmission is within the set distance from the vehicle prevents an unintentional or accidental depression of the input switch from unlocking the vehicle.

Other applications come within the scope of this invention. As other examples, the input switch could initially generate a door unlock signal for a first period of time after actuation. If the switch is held depressed for a longer period of time (i.e. several seconds) then a second signal component is generated to actuate a different accessory, such as a power trunk release. The inventive concept of creating a radio frequency signal having two signal components may have application beyond the automotive area.

These and other features of the present invention will be best understood from the following specification and drawings, the following of which is a brief description.

DETAILED DESCRIPTION OF THE PREFERRED EMBODIMENT

Figure 1:
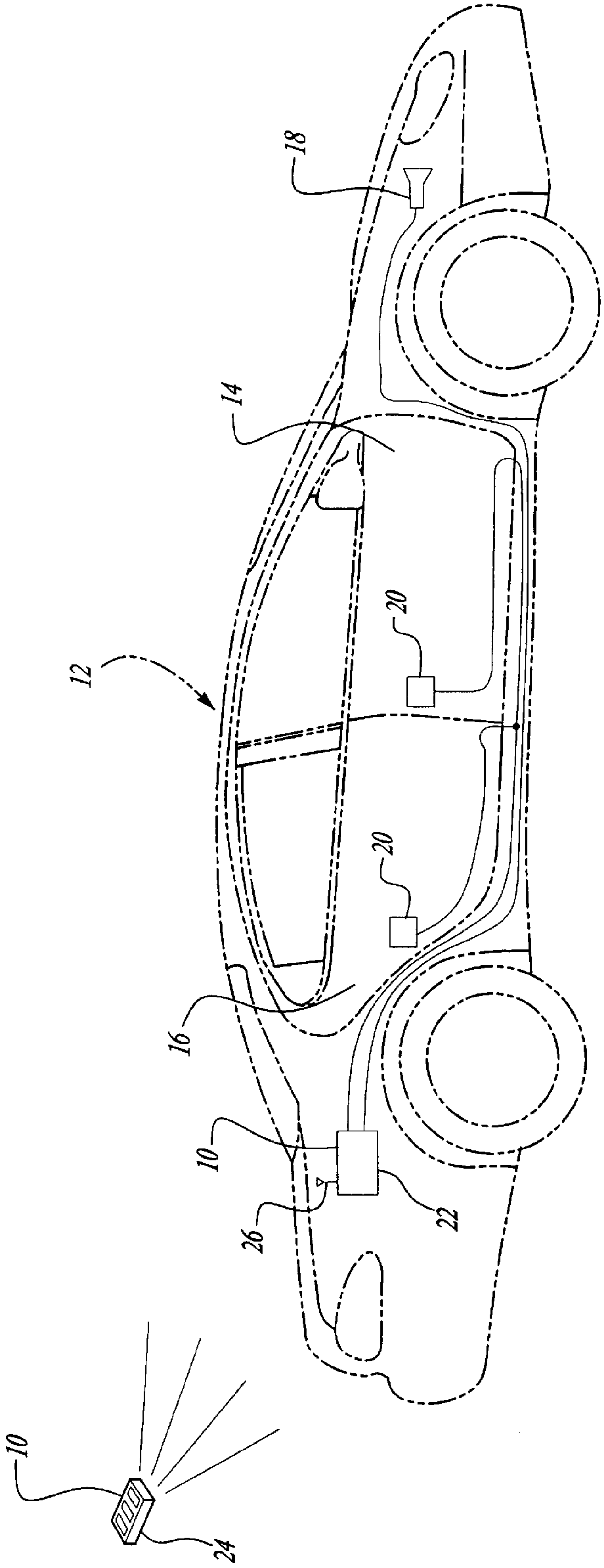
FIG. 1 is a fragmentary perspective view of a remote keyless entry system according to the present invention installed in a vehicle.

FIG. 1 is a fragmentary perspective view of a remote keyless entry system 10 according to the present invention installed in a vehicle 12. The vehicle 12 includes doors 14 and 16, a first electrical vehicle accessory 18, and a second electrical vehicle accessory 20. The remote keyless entry system 10 consists of a RF receiver 22 and a remote control transmitter 24. The RF receiver 22 is electrically connected to the first accessory 18 and the second accessory 20. One of ordinary skill in the art will appreciate that modern vehicles include many electrical accessories and that the RF receiver 22 may be electrically connected to actuate more than two electrical vehicle accessories. The RF receiver 22 includes an antenna 26 to receive or capture local airborne RF signals. Upon receipt of a matching RF signal, the RF receiver 22 electrically actuates the appropriate first or second accessory 18 or 20. In the disclosed example, the first accessory 18 is a horn and the second accessory 20 is the power door locks.

Figure 2:
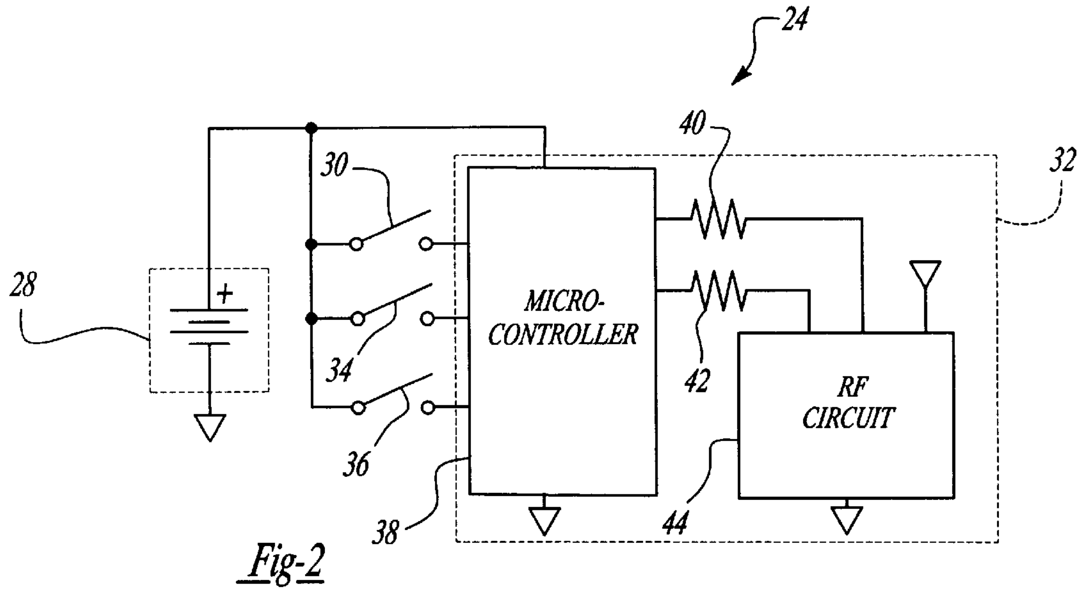
FIG. 2 is an electrical schematic diagram of a remote control transmitter according to the present invention for controlling a plurality of electrical vehicle accessories.

FIG. 2 is an electrical schematic diagram of the remote control transmitter 24 according to the present invention for controlling the first accessory 18 and the second accessory 20. The transmitter 24 includes a power source 28, an input switch 30, and a transmitter circuit 32. When the input switch 30 is manually depressed, an input signal is produced and input to the transmitter circuit 32. The transmitter circuit 32 responds to the one input signal by transmitting a single radio frequency signal carrying first and second RF signal components. The first RF signal component is transmitted to correspond to the first predetermined distance, and the second RF signal component is transmitted to correspond to the second predetermined distance, with the first predetermined distance being greater than the second predetermined distance. In response to receipt of an RF signal containing only the first RF signal component, the RF receiver 22 is programmed to electrically actuate the first accessory 18. In response to receipt of an RF signal containing both the first and second RF signal components, the RF receiver 22 is programmed to actuate the second accessory 20. In this manner, the transmitter 24 is capable of controlling or actuating two different vehicle accessories 18 and 20 with one input switch 30. Typically, the transmitter 24 further includes a second input switch 34 and a third input switch 36 to transmit unique RF signals for controlling other vehicle accessory functions such as locking the power door locks, releasing the truck lid, or switching on the interior lights.

In a preferred embodiment of the present invention, the first accessory 18 consists of a horn and the second accessory 20 consists of power door locks, as shown in FIG. 1. When the input switch 30 is manually depressed, the transmitter 24 transmits the second RF signal component a short distance (i.e. four meters) and the first RF signal component some distance greater than the short distance. When the first and second RF signal components are transmitted at a greater distance from the vehicle 12, the RF receiver 22 receives only the first RF signal component and actuates the horn 18. When the first and second RF signal components are transmitted a distance equal to or less than the shorter distance from the vehicle 12, the RF receiver 22 receives both RF signal components and unlocks the power door locks 20. In this manner, the transmitter 24 is capable of actuating the horn 18 or unlocking the power door locks 20 with one input switch 30.

As shown in FIG. 2, in one embodiment of the present invention, the transmitter circuit 32 further includes a micro-controller 38, a first resistor 40, a second resistor 42, and a RF circuit 44. The micro-controller 38 receives the input signal upon depression of the input switch 30 and produces a first output signal component electrically connected the first resistor 40 and a second output signal component electrically connected to the second resistor 42. The first resistor 40 fixes the output power of the first output signal component thereby establishing the first predetermined distance. Similarly, the second resistor 42 fixes the output power of the second output signal component thereby establishing the second predetermined distance. The RF circuit 44 receives the fixed first and second output signal components and in response broadcasts the first and second RF signal components as a single signal. The RF circuit 44 is of a conventional design. Accordingly, one of ordinary skill in the art will recognize that one of many commonly known RF circuits may be implemented in the present invention.

Figure 3:
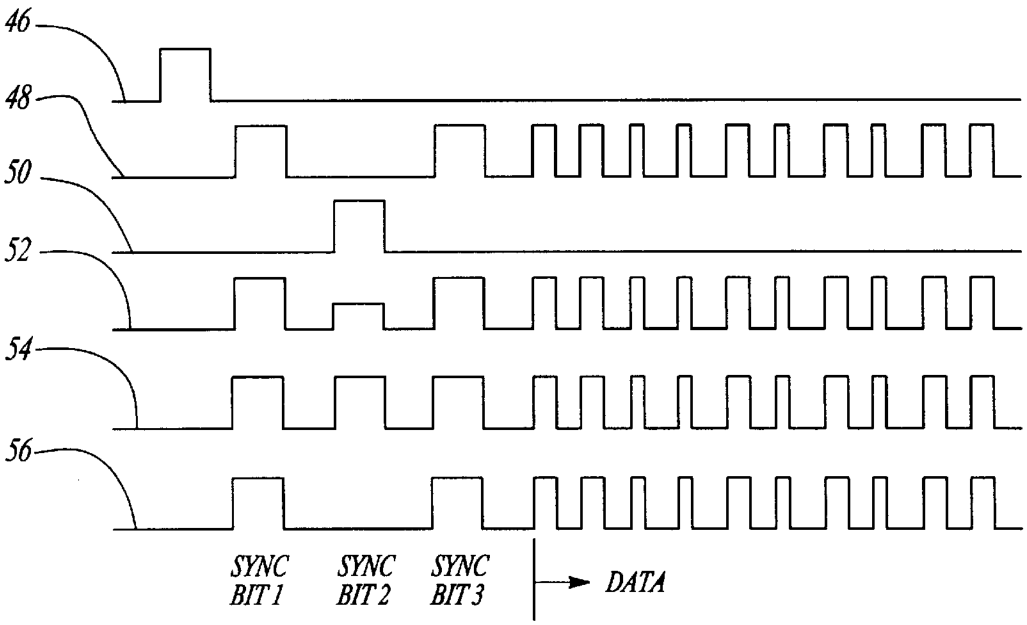
FIG. 3 is a graph charting the electrical signals of a preferred embodiment of the present invention.

FIG. 3 is a graph charting the electrical signals of an embodiment of the present invention. The first signal 46 represents the input signal received by the micro-controller 38 when the input switch 30 is depressed. The second signal 48 represents the first output signal component produced by the micro-controller 38 in response to the input signal and electrically connected to the first resistor 40. As shown, signal 48 consists of high signal values displayed graphically as sync bits 1 and 3. The third signal 50 represents the second output signal component produced by the micro-controller 38 in response to the input signal and electrically connected to the second resistor 42. As shown, signal 50 consists of a high signal value displayed graphically as sync bit 2. The fourth signal 52 represents the transmission power level of the combination of the first and second output signal components. The fifth signal 54 represents the signal received by the RF receiver 22 when the transmitter 24 is within the predetermined distance, four meters in one embodiment, and the input switch 30 is depressed. As shown, sync bit 2 is high.

The sixth signal 56 represents the signal received by the RF receiver 22 when the transmitter 24 is further away then the predetermined distance and the input switch 30 is depressed. As shown, sync bit 2 is low. In this embodiment, the RF receiver 22 distinguishes between the fifth signal 54 and the sixth signal 56 by reading sync bit 2. If sync bit 2 is high, the RF receiver is programmed to actuate the second accessory, that is unlock the power door locks in the aforementioned preferred embodiment. If sync bit 2 is low, the RF receiver 22 is programmed to actuate the first accessory, that is actuate the horn in the aforementioned preferred embodiment.

Figure 4:
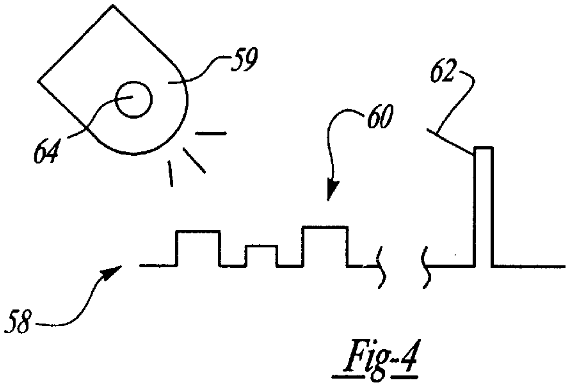
FIG. 4 shows another embodiment.

Another embodiment 58 is shown in FIG. 4. Key fob 59 transmits a signal 60 that may include the two RF signal components as discussed above. A high or "spike" signal value 62 may also be transmitted as input switch 64 is held for a longer period of time (i.e. 2-3 seconds). To this end, a timer and appropriate circuitry are included. Upon receipt of the high value 62, the receiver 22 actuates an accessory, such as the power trunk release. This inventive feature may be viewed independent of or in combination with the RF signal components of the first embodiment.

Many different circuits and controls can be utilized to achieve the inventive goals of this application. Given the disclosure of this application, a worker in this art could design appropriate circuitry to achieve the inventive goals. Preferred embodiments of this invention have been disclosed, however, a worker of ordinary skill in the art would recognize that certain modifications would come within the scope of this invention. For that reason, the following claims should be studied to determine the true scope and content of this invention.

What is claimed is:

1. A remote control transmitter and receiver combination comprising:

a power source;

an input switch for producing one input signal;

a transmitter circuit responsive to said one input signal for transmitting a first radio frequency signal component at a first power and for transmitting a second radio frequency signal component at a lower power; and a receiver for receiving said first and second signal components, said receiver actuating a first accessory when receiving only said first signal component, and actuating a second accessory when receiving a combination of said first and second signal components.

2. A combination as set forth in claim 1 wherein said first power transmits said first signal component a first predetermined distance and said lower power transmits said second signal componenet a shorter second predetermined distance.

3. A combination as set forth in claim 2 wherein said transmitter circuit includes a first resistor for establishing said first predetermined distance and a second resistor for establishing said second predetermined distance.

4. A combination as set forth in claim 1 wherein said first signal component is transmitted upon initial actuation of said switch, and said second signal component is transmitted after a period of time has elapsed.

5. A remotely controlled door lock system for a vehicle comprising:

a vehicle having doors and door locks, said vehicle including an accessory;

a portable transmitter for transmitting a first radio frequency signal component a first predetermined distance and for transmitting a second radio frequency signal component a second predetermined distance less than said first predetermined distance;

a receiver for receiving said radio frequency signal components and for actuating said door locks and said accessory; and said accessory being actuated in response to said first radio frequency signal component and said door locks being actuated in response to the combination of said first and second radio frequency signal components.

6. A remotely controlled door lock system as set forth in claim 5 wherein said transmitter includes a transmitter circuit having a first resistor for establishing said first predetermined distance and a second resistor for establishing said second predetermined distance.

7. A remotely controlled door lock system as set forth in claim 6 wherein said transmitter circuit includes a micro-controller for receiving one input signal and for producing a first output signal component electrically connected to said first resistor of said transmitter circuit and a second output signal component electrically connected to said second resistor of said transmitter circuit.

8. A remotely controlled door lock system as set forth in claim 5 wherein said accessory consists a horn.

9. A system comprising:

a remote control transmitter having a single input switch for broadcasting at least two radio frequency signal components at different powers; and a radio frequency receiver for controlling at least two devices, said receiver receiving and identifying each of said radio frequency signal components and actuating a corresponding one of said at least two devices in response to each of said radio frequency signal components.

10. A system as set forth in claim 9 wherein said transmitter broadcasts one of said radio frequency signal components a first predetermined distance and the other of said radio frequency signal components a second predetermined distance less than said first predetermined distance.

11. A system as set forth in claim 10 wherein said transmitter includes a transmitter circuit having a first resistor for establishing said first predetermined distance and a second resistor for establishing said second predetermined distance.

12. A system as set forth in claim 11 wherein said transmitter circuit includes a micro-controller for receiving one input signal from said input switch and for producing a first output signal component electrically connected to said first resistor of said transmitter circuit and a second output signal component electrically connected to said second resistor of said transmitter circuit.

* * * * *